US011025354B2

(12) United States Patent
Venezia

(10) Patent No.: US 11,025,354 B2
(45) Date of Patent: Jun. 1, 2021

(54) TARGETED FINGERPRINTING OF RADIO BROADCAST AUDIO

(71) Applicant: Ibiquity Digital Corporation, Columbia, MD (US)

(72) Inventor: Paul Venezia, Keene, NH (US)

(73) Assignee: Ibiquity Digital Corporation, Columbia, MD (US)

(*) Notice: Subject to any disclaimer, the term of this patent is extended or adjusted under 35 U.S.C. 154(b) by 0 days.

(21) Appl. No.: 16/516,783

(22) Filed: Jul. 19, 2019

(65) Prior Publication Data

US 2021/0021360 A1 Jan. 21, 2021

(51) Int. Cl.
| | |
|---|---|
| *H04H 60/70* | (2008.01) |
| *H04H 60/73* | (2008.01) |
| *H04H 60/46* | (2008.01) |
| *H04H 60/58* | (2008.01) |
| *G01S 5/02* | (2010.01) |

(Continued)

(52) U.S. Cl.
CPC ............ *H04H 60/58* (2013.01); *G01S 5/021* (2013.01); *G06F 16/683* (2019.01); *G10L 19/018* (2013.01)

(58) Field of Classification Search
CPC ............... H04H 20/18; H04H 2201/37; H04H 2201/40; H04H 60/46; H04H 60/51; H04H 60/58; H04H 60/64; H04H 60/70; H04H 60/72; H04H 60/73; H04H 60/74; H04H 60/85; H04H 20/62; H04H 20/93; H04H 60/80; H04H 60/90; H04H 60/91; H04H 60/92; H01M 8/0234; H01M 8/0239;

(Continued)

(56) References Cited

U.S. PATENT DOCUMENTS 8,560,583 B2 * 10/2013 Mallinson .............. G06Q 30/02
707/802
10,142,679 B2 * 11/2018 Koh ..................... H04N 21/251
(Continued)

FOREIGN PATENT DOCUMENTS

| EP | 2070231 A1 | 6/2009 |
|---|---|---|
| WO | WO-2005073875 A1 | 8/2005 |

OTHER PUBLICATIONS

"International Application Serial No. PCT/US2019/042619, International Search Report dated May 6, 2020", 4 pgs.
(Continued)

*Primary Examiner* — Tan H Trinh
(74) *Attorney, Agent, or Firm* — Schwegman Lundberg & Woessner, P.A.

(57) ABSTRACT

A system comprises an intermediate communication platform that provides an interface to an Internet network; and a first server including: a port operatively coupled to the intermediate communication platform, processing circuitry, and a service application for execution by the processor. The service application is configured to: receive geographic location information of a radio receiver via the intermediate communication platform; determine one or more radio broadcasts available to the radio receiver according to the geographic location information; and send metadata for the radio broadcast, the metadata including an indication whether content of the radio broadcast is suitable for an audio fingerprinting process to the radio receiver via the intermediate communication platform.

20 Claims, 4 Drawing Sheets

(51) Int. Cl.
*G10L 19/018* (2013.01)
*G06F 16/683* (2019.01)

(58) Field of Classification Search
CPC .. H01M 8/0243; H01M 8/0258; H01M 8/026; H01M 8/188; Y02E 60/528
USPC ............... 455/41.1, 41.2, 3.01, 3.06, 556.1; 700/94, 769; 726/30; 709/224
See application file for complete search history.

(56) References Cited

U.S. PATENT DOCUMENTS

| | | | | |
|---|---|---|---|---|
| 10,212,490 | B2* | 2/2019 | Major | H04N 21/8358 |
| 2004/0172413 | A1* | 9/2004 | Shin | G06F 16/81 |
| 2006/0107056 | A1* | 5/2006 | Bhatt | G06T 1/0021 |
| | | | | 713/176 |
| 2008/0187188 | A1* | 8/2008 | Beletski | H04H 60/58 |
| | | | | 382/124 |
| 2008/0214236 | A1* | 9/2008 | Harb | H04H 60/43 |
| | | | | 455/556.1 |
| 2010/0261424 | A1* | 10/2010 | Mittal | H04H 60/37 |
| | | | | 455/3.01 |
| 2011/0124283 | A1* | 5/2011 | DeLuca | H04H 20/62 |
| | | | | 455/3.06 |
| 2011/0289098 | A1* | 11/2011 | Oztaskent | H04N 21/233 |
| | | | | 707/769 |
| 2012/0123831 | A1* | 5/2012 | King | H04L 63/20 |
| | | | | 705/14.7 |
| 2012/0215329 | A1* | 8/2012 | Jiang | H03G 3/3005 |
| | | | | 700/94 |
| 2013/0065213 | A1* | 3/2013 | Gao | G10H 1/365 |
| | | | | 434/307 A |
| 2014/0106663 | A1* | 4/2014 | Jurascheck | H04H 60/64 |
| | | | | 455/3.06 |
| 2014/0134941 | A1* | 5/2014 | Anniballi | H04H 60/43 |
| | | | | 455/3.02 |
| 2014/0195028 | A1* | 7/2014 | Emerson, III | G10L 19/018 |
| | | | | 700/94 |
| 2014/0280879 | A1* | 9/2014 | Skolicki | H04L 69/28 |
| | | | | 709/224 |
| 2014/0282662 | A1* | 9/2014 | Major | H04N 21/8358 |
| | | | | 725/18 |
| 2014/0283142 | A1* | 9/2014 | Shepherd | G06F 3/0482 |
| | | | | 726/30 |
| 2014/0336797 | A1* | 11/2014 | Emerson, III | H04H 60/37 |
| | | | | 700/94 |
| 2014/0336799 | A1* | 11/2014 | Emerson, III | G06F 16/683 |
| | | | | 700/94 |
| 2015/0116360 | A1* | 4/2015 | Jones | G06T 11/60 |
| | | | | 345/634 |
| 2015/0170673 | A1* | 6/2015 | Lynch | G06Q 30/0204 |
| | | | | 700/94 |
| 2015/0341890 | A1* | 11/2015 | Corbellini | H04W 4/024 |
| | | | | 455/456.6 |
| 2016/0314794 | A1* | 10/2016 | Leitman | G10L 19/018 |
| 2017/0282383 | A1* | 10/2017 | Blakely | B25J 11/0005 |
| 2019/0052387 | A1 | 2/2019 | Dillon | |
| 2019/0182486 | A1* | 6/2019 | Arana | H04N 19/139 |
| 2019/0238244 | A1* | 8/2019 | Thramann | H04H 20/12 |
| 2019/0272834 | A1* | 9/2019 | Brenner | G10L 19/018 |
| 2019/0342020 | A1* | 11/2019 | Carlock | H04H 60/73 |
| 2019/0362405 | A1* | 11/2019 | Stone | G06K 9/00744 |

OTHER PUBLICATIONS

"International Application Serial No. PCT/US2019/042619, Written Opinion dated May 6, 2020", 5 pgs.

* cited by examiner

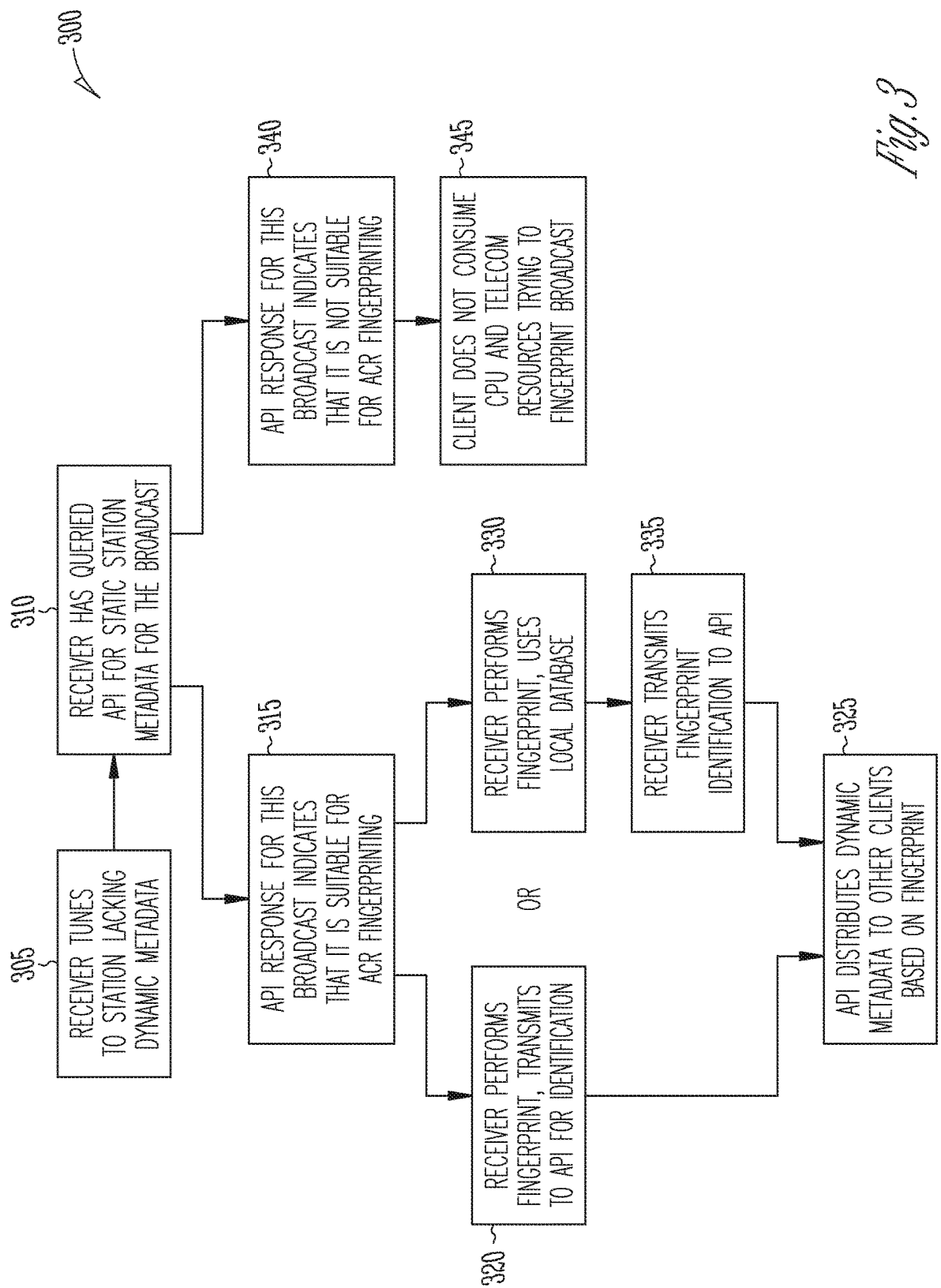

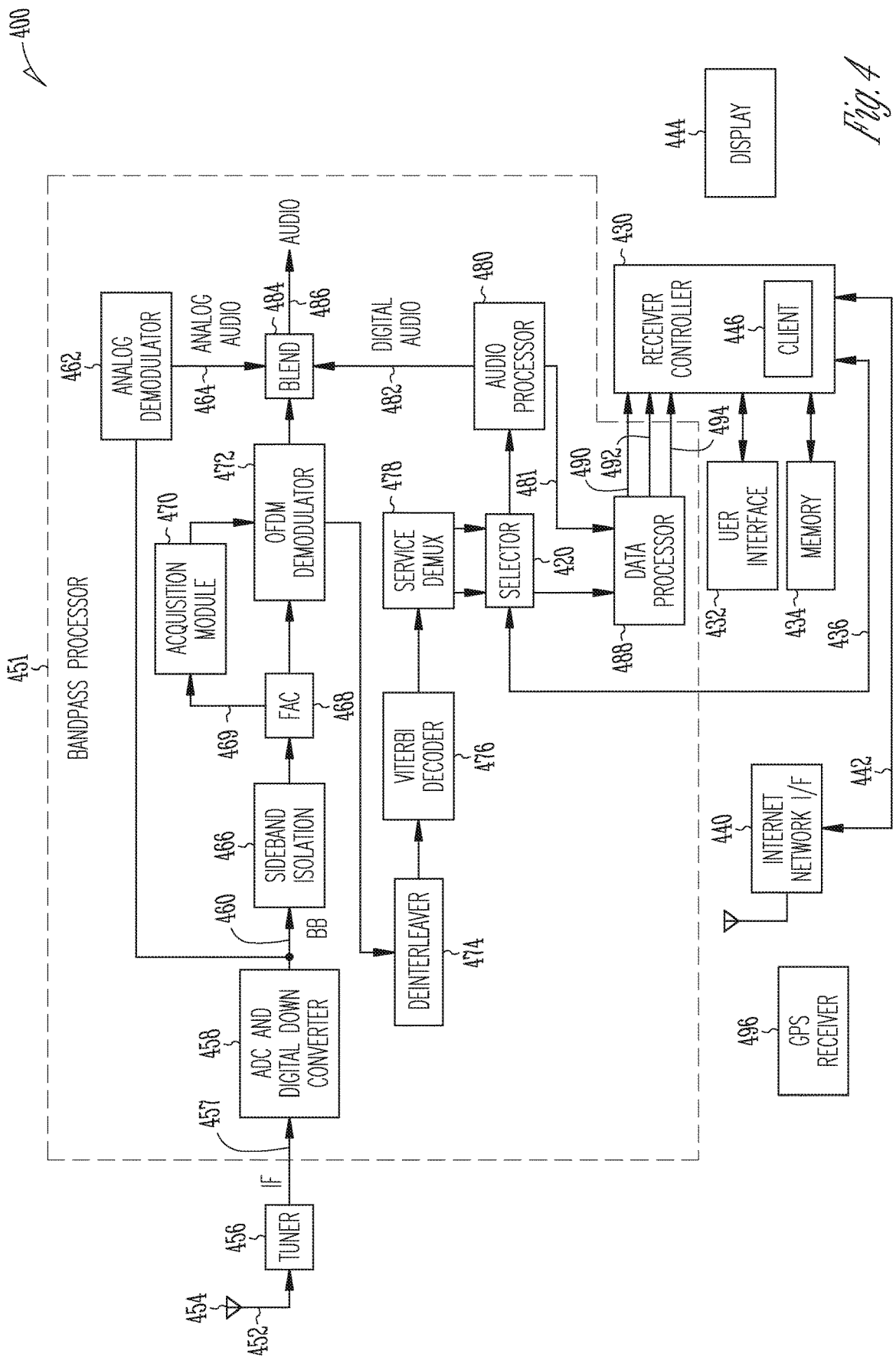

TARGETED FINGERPRINTING OF RADIO BROADCAST AUDIO

TECHNICAL FIELD

The technology described in this patent document relates to systems and methods for providing supplemental data (e.g., metadata) that is associated with over-the-air radio broadcast signals.

BACKGROUND

Over-the-air radio broadcast signals are used to deliver a variety of programming content (e.g., audio, etc.) to radio receiver systems. Such over-the-air radio broadcast signals can include conventional AM (amplitude modulation) and FM (frequency modulation) analog broadcast signals, digital radio broadcast signals, hybrid analog and digital broadcast signals, or other broadcast signals. Hybrid radio broadcasting technology and digital radio broadcasting technology can deliver audio and data services to mobile, portable, and fixed receivers.

Service data that includes multimedia programming can be included with radio broadcasts. The broadcast of the service data may be contracted by companies to include multimedia content associated with primary or main radio program content. However, service data may not always be available with the radio broadcast. In this case it may be desirable to identify the audio content being broadcast, and match service data with the audio content. Some current broadcast radio content information systems rely on digital "fingerprinting" of the audio content. However, the audio fingerprinting process can consume a lot of memory of the radio receiver and the identification service for the fingerprinting can be expensive in terms of cost and in terms of resources such as memory resources and processing resources of the radio receivers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, embodiments of the radio broadcast metadata distribution system and method determine whether received audio is suitable for fingerprinting before the fingerprinting is used to obtain audio metadata related to the radio broadcast. An example radio system includes an intermediate communication platform that provides an interface to an Internet network, and a first server including: a port operatively coupled to the intermediate communication platform, processing circuitry, and a service application for execution by the processing circuitry. The service application is configured to: receive geographic location information of a radio receiver via the intermediate communication platform, determine one or more radio broadcasts available to the radio receiver according to the geographic location information, and send metadata for the radio broadcast to the radio receiver via the intermediate communication platform, the metadata including an indication whether content of the radio broadcast is suitable for an audio fingerprinting process.

An example radio receiver includes radio frequency (RF) receiver circuitry, an Internet network interface, a display, processing circuitry, and a client application program that includes instructions for execution by the processing circuitry. The RF circuitry is configured to receive a radio broadcast signal. The client application program is configured to send geographical location information to an audio metadata service application via the Internet network interface, and receive via the Internet network interface, metadata for a radio broadcast available to the radio receiver, the metadata including an indication whether content of the radio broadcast is suitable for an audio fingerprinting process.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a flow diagram of an example of a method of distributing metadata to radio receivers.

FIG. 4 is a block diagram of portions of an example of a radio receiver.

DETAILED DESCRIPTION

Figure 1:
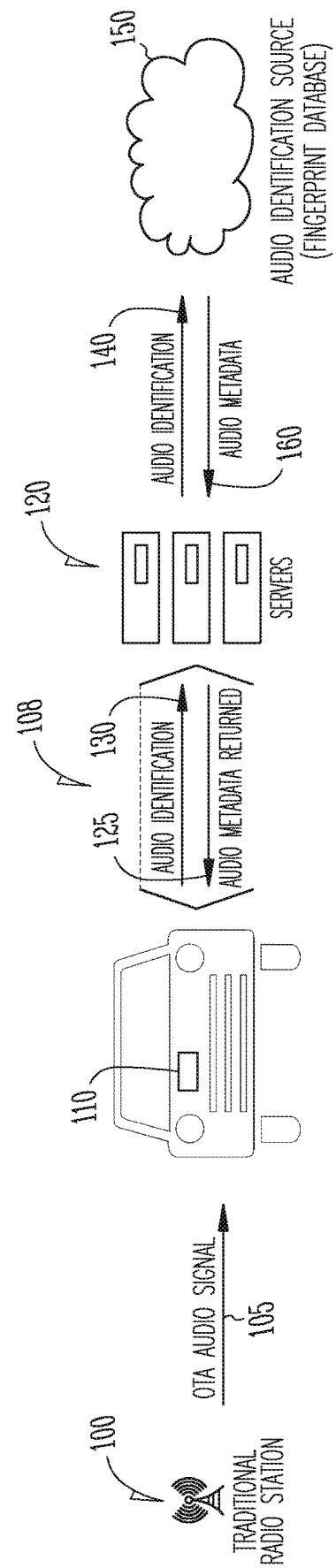
FIG. 1 is a block diagram illustrating an overview of embodiments of the radio system.

In the following description of embodiments of a radio broadcast metadata distribution system, reference is made to the accompanying drawings. These drawings show by way of illustration specific examples of how embodiments of the metadata distribution system may be practiced. It is understood that other embodiments may be utilized, and structural changes may be made without departing from the scope of the claimed subject matter.

Over-the-air radio broadcast signals are commonly used to deliver a variety of programming content (e.g., audio, etc.) to radio receiver systems. Main program service (MPS) data and supplemental program service (SPS) data can be provided to radio broadcast receiver systems. Metadata associated with the programming content can be delivered in the MPS data or SPS data via the over-the-air radio broadcast signals. The metadata can be included in a sub-carrier of the main radio signal. In IBOC radio, the radio broadcast can be a hybrid radio signal that may include a streamed analog broadcast and a digital audio broadcast. Sub-carriers of the main channel broadcast can include digital information such as text or numeric information, and the metadata can be included in the digital information of the sub-carriers. Thus, a hybrid over-the-air radio broadcast can include an analog audio broadcast, a digital audio broadcast, and other text and numeric digital information such as metadata streamed with the over-the-air broadcast. The programming content may be broadcast according to the DAB standard, the digital radio mondiale (DRM) standard, radio data system (RDS) protocol, the radio broadcast data system (RBDS) protocol, or a high definition (HD) IBOC radio protocol.

The metadata can include both "static" metadata and "dynamic" metadata. Static metadata changes infrequently or does not change. The static metadata may include the radio station's call sign, name, logo (e.g., higher or lower logo resolutions), slogan, station format, station genre, language, web page uniform resource locator (URL), URL for social media (e.g., Facebook, Twitter), phone number, short message service (SMS) number, SMS short code, program identification (PI) code, country, or other information.

Dynamic metadata changes relatively frequently. The dynamic metadata may include a song name, artist name, album name, album image, artist image (e.g., related to content currently being played on the broadcast), advertisements, enhanced advertisements (e.g., title, tag line, image, phone number, SMS number, URL, search terms), program schedules (image, timeframe, title, artist name, DJ name, phone number, URL), service following data, or other information. When the radio receiver system is receiving an over-the-air radio broadcast signal from a particular radio station, the receiver system may receive both static metadata and dynamic metadata.

Another approach to provide service data is to combine radio information broadcast over-the-air (OTA) with Internet Protocol (IP) delivered content to provide an enhanced user experience. An example of this type of service is DTS® Connected Radio' service, which combines OTA analog/digital AM/FM radio with IP delivered content. The combined service receives dynamic metadata (such as artist information and song title, on-air radio program information and station contact information) directly from local radio broadcasters, which is then paired with IP-delivered content (e.g., metadata), and displayed in vehicles. The DTS Connected Radio service supports all global broadcast standards including analog, DAB, DAB+ and HD Radio™. The radio receivers of the vehicles integrate data from Internet services with broadcast audio to create a rich media experience. One of the Internet services provided is information about what the radio stations are currently playing and have played.

As explained previously herein, service data may not always be available with a radio broadcast, and it may be desirable to send an audio fingerprint to identify the content of the over-the-air radio broadcast and receive metadata for the identified radio broadcast for presentation to the user. The audio fingerprint could be transmitted from the in-vehicle radio receiver to a server that performs automatic content recognition (ACR) to identify content of the over-the-air radio broadcast.

However, the digital fingerprinting and identification of the audio fingerprint can be expensive in terms of cost of the service and in terms of resources of the radio receiver, such as processor and memory user. These resources may be wasted if the broadcast audio being received by the radio receiver is not suitable for the ACR fingerprinting and identification process. For example, if the broadcast audio does not include music, the ACR process may fail. This may happen if the broadcast audio contains content of a talk program or a commercial. An improvement would be to verify that the broadcast audio is suitable for ACR fingerprinting and identification before the process is started.

FIG. 1 is a block diagram illustrating an overview of embodiments of the radio system. A traditional broadcast radio station 100 transmits an OTA audio signal 105 to the radio receiver 110 of a vehicle. The OTA audio signal 105 can be an analog audio signal, a digital audio signal, or a hybrid audio signal. The radio service provided is a combined OTA-IP radio service, and the in-vehicle radio receiver 110 can receive both an OTA audio signal 105 and an IP stream. The IP stream is received via an intermediate communication platform 108 from one or more servers 120. The intermediate communication platform 108 may be a cellular phone network or a telematics network.

Figure 2:
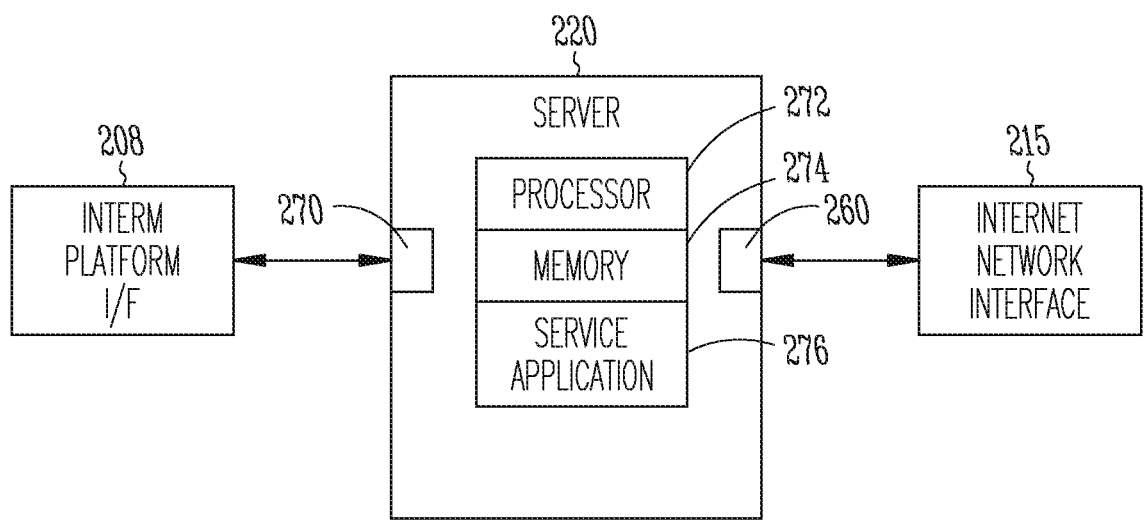
FIG. 2 is a block diagram of an example of a server to provide an Internet Protocol stream to radio receivers.

FIG. 2 is a block diagram of an example of a radio system server to provide an IP stream to radio receivers. The server 220 includes a processing circuitry 272, a memory 274, and a service application 276 or application program interface (API) for execution by the processor 272. The service application 276 can comprise software that operates using the operating system software of the server 220. The server 220 includes a port 270 operatively coupled to an interface to the intermediate communication platform 208 that provides the IP stream and receives information from radio receivers.

Returning to FIG. 1, to receive metadata for radio broadcasts, the in-vehicle radio receiver 110 sends geographic location information to the service application of a server 120. One or more of the servers determines the radio broadcasts available to the radio receiver according to the geographic location information, and the service application sends the metadata for the determined radio broadcasts to the radio receiver via the intermediate communication platform. The one or more servers also sends an indication of suitability of the content of radio broadcasts for the fingerprinting process. The indication can be included with the metadata (e.g., in a specified field of the metadata). The indication is that the content is either suitable or not suitable for audio fingerprinting. An indication of suitability is sent for each radio broadcast of those radio broadcasts determined to be available to the radio receiver. The indications of suitability can be a flag or a digital code word stored in memory for radio broadcasts. In variations, the indications of suitability of fingerprinting can be stored in association with the metadata for the radio broadcasts.

If the radio receiver 110 of a vehicle subsequently tunes to a radio broadcast for which the radio receiver 110 does not have metadata (e.g., dynamic metadata), the radio receiver 110 checks the indication of the suitability of the content of the radio broadcast for fingerprinting. If the indication for the radio broadcast is that the content is suitable for the fingerprinting process, the radio receiver generates an audio fingerprint and sends the audio fingerprint 130 to the service application. The service application determines audio metadata of a radio broadcast corresponding to the audio fingerprint and sends the determined audio metadata 125 to the radio receiver 110. The service application may track the radio broadcasts being tuned to by multiple radio receivers. In response to determining the audio metadata from the audio fingerprint provided by the first radio receivers, the service application may send the audio metadata to multiple radio receivers receiving the radio broadcast. The audio metadata may be sent using the intermediate communication platform 108.

If the indication for the radio broadcast is that the content is not suitable for the fingerprinting process, the radio receiver does not generate an audio fingerprint. The radio receiver 110 may do nothing or may merely send an acknowledge back via the intermediate communication platform 108 according to a communication protocol. The radio receiver 110 may display the metadata (e.g., static metadata) that is available. The resources of the radio receiver are not wasted by generating and sending a digital fingerprint that would fail the ACR fingerprint identification process.

According to some embodiments, to determine the audio metadata corresponding to the receiving audio fingerprint, the server 120 includes a memory that may store a fingerprint database that stores the audio metadata in association with audio fingerprint information in the server memory. The service application determines the audio metadata by retrieving the audio metadata from the memory using the audio fingerprint.

In some embodiments, the service application receives the audio metadata from an audio identification source 150. The service application of a first server 120 receives the audio fingerprint 130 from the radio receiver 110 and forwards the audio fingerprint 140 to the audio identification source 150. The first server and the audio identification source may communicate using a communication network. The communication network may be the intermediate communication platform 108 or another communication network. As shown in the example of FIG. 2, the server 220 can include a second port 260 operatively coupled to an Internet network interface 215. In certain embodiments, the Internet network interface 215 includes an Internet access point (e.g., a modem), and the port 260 can include (among other options) a communication (COMM) port, or a universal serial bus (USB) port.

The audio identification source 150 is shown as residing in the cloud in FIG. 1. The term "cloud" is used herein to refer to a hardware abstraction. Instead of one dedicated server processing the audio fingerprint and returning the audio metadata, sending the audio fingerprint to the cloud can include sending the audio fingerprint to a data center or processing center. The actual server used to process the audio file content information is interchangeable at the data center or processing center. The audio identification source 150 may include a second server that includes the fingerprint data base. The audio identification source 150 receives the audio fingerprint 140 forwarded from the first server and returns the audio metadata 160 to the first server and may send other associated metadata to the first server 120. The first server 120 sends the audio metadata 125 on to the radio receiver 110.

FIG. 3 is a flow diagram of an example of a method 300 of providing metadata to a radio receiver. The method relates to a vehicle that is in contact with a radio system that combines an OTA radio broadcast with IP delivered content, such a DTs Connected Radio system for example. The method may be performed using a client program of the radio receiver of the vehicle. At 305, the in-vehicle radio receiver tunes to a radio station, and the radio receiver lacks dynamic metadata associated with a program currently being broadcast by the radio station. At 310, the radio receiver has queried the radio service system for static radio station metadata for the radio broadcast. The radio service system may include an application program interface (API) or service application executing on a server of the radio service system.

The radio receiver may send geographic location information with the query to the radio system, and the API sends static metadata for any radio broadcast that is available for reception by the radio receiver. The API also includes in the metadata an indication for a radio broadcast whether the content of the radio broadcast is suitable for audio fingerprinting and identification.

At 315, the radio receiver has received an indication from the API for the radio broadcast missing the dynamic metadata that the radio broadcast is suitable for ACR fingerprinting and identification. Because of the indication, at 320 the radio receiver generates an audio fingerprint and sends the audio fingerprint to the API. The ACR fingerprinting process may be performed by the client program or by other software of the radio receiver.

The radio receiver sends the audio fingerprint to the radio system using an Internet connection. The radio system identifies the audio program corresponding to the audio fingerprint and determines the audio metadata associated with the audio program. At 325, the API distributes the dynamic metadata to the radio receiver and may distribute the dynamic metadata to other radio receivers that are receiving the radio broadcast (e.g., via the intermediate communication platform). In some embodiments, the dynamic metadata is distributed to the radio receivers that are capable of receiving the radio broadcast regardless of the radio station to which the receivers are tuned.

In some embodiments, the radio receiver may store an audio fingerprint database, and before sending the audio fingerprint to the radio system, at 330 the radio receiver may first determine if it is storing the missing the dynamic metadata locally. For example, the radio receiver may store the results of previous audio fingerprinting and may check the database to see if the corresponding audio program was previously identified. If the audio fingerprint is found in the local database, the radio receiver uses the corresponding dynamic metadata for the radio broadcast. This reduces the resources consumed at the radio receiver in determining the audio metadata.

At 340, in response to the query for the radio broadcast, the radio receiver receives an indication from the API that the content of the radio broadcast is not suitable for ACR fingerprinting. In this case, the client program of the radio receiver at 345 does not expend any resources of the radio receiver such as processing bandwidth, memory space, or communication time in generating and sending a digital fingerprint of the radio broadcast. The radio receiver may display the metadata (e.g., static metadata) that is available.

FIG. 4 is a block diagram of portions of an example of a radio receiver 400. The radio receiver is able to receive an OTA radio broadcast and is able to receive IP delivered content. In certain variations, the radio receiver is a DTS Connected Radio receiver. The radio receiver 400 may be the radio receiver 110 of a vehicle shown in the example of FIG. 1. The radio receiver 400 includes a wireless Internet network interface 440 for receiving metadata via wireless IP and other components for receiving over-the-air radio broadcast signals. The Internet network interface 440 and receiver controller 430 may be collectively referred to as a wireless internee protocol hardware communication module of the radio receiver.

The radio receiver 400 includes radio frequency (RF) receiver circuitry including tuner 456 that has an input 452 connected to an antenna 454. The antenna 454, tuner 456, and baseband processor 451 may be collectively referred to as an over-the-air radio broadcast hardware communication module of the radio receiver. The RF circuitry is configured to receive an audio broadcast signal.

Within the baseband processor 451, an intermediate frequency signal 457 from the tuner 456 is provided to an analog-to-digital converter and digital down converter 458 to produce a baseband signal at output 460 comprising a series of complex signal samples. The signal samples are complex in that each sample comprises a "real" component and an "imaginary" component. An analog demodulator 462 demodulates the analog modulated portion of the baseband signal to produce an analog audio signal on line 464. The digitally modulated portion of the sampled baseband signal is filtered by isolation filter 466, which has a pass-band frequency response comprising the collective set of subcarriers $f_1$-$f_n$ present in the received OFDM signal. First adjacent canceller (FAC) 468 suppresses the effects of a first-adjacent interferer. Complex signal 469 is routed to the input of acquisition module 470, which acquires or recovers OFDM symbol timing offset/error and carrier frequency offset/error from the received OFDM symbols as represented in received complex signal 469. Acquisition module 470 develops a symbol timing offset $\Delta t$ and carrier frequency offset $\Delta f$, as well as status and control information. The signal is then demodulated (block 472) to demodulate the digitally modulated portion of the baseband signal. The digital signal is de-interleaved by a de-interleaver 474, and decoded by a Viterbi decoder 476. A service de-multiplexer 478 separates main and supplemental program signals from data signals. The supplemental program signals may include a digital audio file received in an IBOC DAB radio broadcast signal.

An audio processor 480 processes received signals to produce an audio signal on line 482 and NIPSD/SYSD 481. In embodiments, analog and main digital audio signals are blended as shown in block 484, or the supplemental program signal is passed through, to produce an audio output on line 486. A data processor 488 processes received data signals and produces data output signals on lines 490, 492, and 494. The data lines 490, 492, and 494 may be multiplexed together onto a suitable bus such as an $I^2C$, SPI, UART, or USB. The data signals can include, for example, data representing the metadata to be rendered at the radio receiver.

The Internet network interface 440 may be managed by the receiver controller 430. As illustrated in FIG. 4, the Internet network interface 440 and the receiver controller 430 are operatively coupled via a line 442, and data transmitted between the Internet network interface 440 and the receiver controller 430 is sent over this line 442. A selector 420 may connect to receiver controller 430 via line 436 to select specific data received from the Internet network interface 440. The data may include metadata (e.g., text, images, video, etc.), and may be rendered at substantially the same time that primary or supplemental programming content received over-the-air in the IBOC DAB radio signal is rendered.

The receiver controller 430 receives and processes the data signals. The receiver controller 430 may include a microcontroller that is operatively coupled to the user interface 432 and memory 434. The microcontroller may be an 8-bit RISC microprocessor, an advanced RISC machine 32-bit microprocessor, or any other suitable microprocessor or microcontroller. Additionally, a portion or all of the functions of the receiver controller 430 could be performed in a baseband processor (e.g., the audio processor 480 and/or data processor 488). The user interface 432 may include an input/output (I/O) processor that controls the display 444, which may be any suitable visual display such as an LCD or LED display. In certain embodiments, the user interface 432 may also control user input components via a touch-screen display. In certain embodiments, the user interface 432 may also control user input from a keyboard, dials, knobs or other suitable inputs. The memory 434 may include any suitable data storage medium such as RAM, Flash ROM (e.g., an SD memory card), and/or a hard disk drive. The radio receiver 400 may also include a global positioning system (GPS) receiver 496 to receive GPS coordinates.

The processing circuitry of the receiver controller 430 is configured to perform instructions included in a client application program or "client" installed in the radio receiver. The client 446 is able to generate an audio fingerprint from audio broadcasts received via the RF receiver circuitry. The client 446 also sends geographical location information to an audio metadata service application via the Internet network interface 440. The radio receiver may include a GPS receiver 496 and the client may send GPS coordinates as the geographical location information. In response to sending the geographical information, the client 446 receives metadata for any radio broadcast that is available to the radio receiver at its indicated geographic location. Included in this metadata is an indication for each radio broadcast whether the content of the radio broadcast is suitable for the ACR fingerprinting and identification process.

As explained previously herein, when audio metadata is missing or unavailable for the current radio broadcast to which the radio receiver is tuned, the client generates an audio fingerprint of the radio broadcast when the indication for that radio broadcast is that its content is suitable for the audio fingerprinting process. The client 446 sends the generated audio fingerprint to the audio metadata service application via the Internet network interface. The audio fingerprint is processed by the service application, and the client 446 receives dynamic metadata associated with the radio broadcast corresponding to the audio fingerprint. The dynamic metadata may be received via the Internet network. In certain embodiments, the dynamic metadata is received via one or more sub-carriers of the main channel OTA broadcast. The client 446 displays the information included in the received dynamic metadata.

When the indication is that content of the radio broadcast signal is not suitable for the audio fingerprinting process, the client 446 does not generate the audio fingerprint. The client 446 may do nothing in response to the missing audio metadata or may display the metadata that is available (e.g., static metadata instead of dynamic metadata).

The systems, devices, and methods described provide metadata to a radio receiver of a vehicle. The radio receiver is able to perform audio fingerprinting, but the systems, devices, and methods prevent the radio receiver from performing the audio fingerprinting and requesting identification for the audio fingerprint when the content of a radio broadcast is not suitable for the fingerprinting and identification process. This saves significant computing resources and communication bandwidth of the radio receiver.

Alternate Embodiments and Exemplary Operating Environment

Example 1 includes subject matter (such as a system to provide audio metadata to a radio receiver) comprising an intermediate communication platform that provides an interface to an Internet network, and a first server. The first server includes a port operatively coupled to the intermediate communication platform, processing circuitry, and a service application for execution by the processor. The service application is configured to: receive geographic location information of a radio receiver via the intermediate communication platform; determine one or more radio broadcasts available to the radio receiver according to the geographic location information; and send metadata for the radio broadcast to the radio receiver via the intermediate communication platform. The metadata includes an indication whether content of the radio broadcast is suitable for an audio fingerprinting process.

In Example 2, the subject matter of Example 1 optionally includes a server configured to store indications of suitability of the audio fingerprinting process for multiple radio broadcasts in association with metadata for the multiple radio broadcasts, and a service application configured to determine all radio broadcasts available to the radio receiver according to the geographic location information; and send the metadata for the determined radio broadcasts, including the indications of suitability of the audio fingerprinting process for the determined radio broadcasts, in response to receiving the geographic location information.

In Example 3, the subject matter of one or both Examples 1 and 2 optionally includes a service application configured to: receive an audio fingerprint from the radio receiver via the intermediate communication platform; determine audio metadata of a radio broadcast corresponding to the audio fingerprint; and send the determined audio metadata to the radio receiver.

In Example 4, the subject matter of one or any combination of Examples 1-3 optionally includes a service application configured to send the determined audio metadata to multiple radio receivers via the intermediate communication platform.

In Example 5, the subject matter of one or any combination of Examples 1-4 optionally includes a server including a memory configured to store the audio metadata in association with audio fingerprint information, and the service application is configured to determine the audio metadata by retrieving the audio metadata from the memory using the audio fingerprint.

In Example 6, the subject matter of one or any combination of Examples 1-4 optionally includes a second server configured to store the audio metadata; and a communication network operatively coupled to the first and second servers. The service application of the first server is configured to determine the audio metadata by forwarding the audio fingerprint to the second server via the communication network and receive the audio metadata from the second server.

In Example 7, the subject matter of one or any combination of Examples 1-6 optionally includes a service application configured to send the indication whether content of the radio broadcast is suitable for an audio fingerprinting process with static metadata, receive an audio fingerprint from the radio receiver via the intermediate communication platform, determine dynamic metadata of a radio broadcast corresponding to the audio fingerprint, and send the determined dynamic metadata to the radio receiver via the intermediate communication platform.

In Example 8, the subject matter of one or any combination of Examples 1-7 optionally includes the intermediate communication platform being a cellular phone network, In Example 9, the subject matter of one or any combination of Examples 1-7 optionally includes the intermediate communication platform being a telematics network.

Example 10 can include subject matter (such as a radio receiver) or can optionally be combined with one or any combination of Examples 1-9 to include such subject matter, comprising radio frequency (RF) receiver circuitry configured to receive a radio broadcast signal, an Internet network interface, a display, processing circuitry, and a client application program including instructions for execution by the processing circuitry. The client application program is configured to send geographical location information to an audio metadata service application via the Internet network interface, and receive, via the Internet network interface, metadata for a radio broadcast available to the radio receiver, the metadata including an indication whether content of the radio broadcast is suitable for an audio fingerprinting process.

In Example 11, the subject matter of Example 10 optionally includes a client application program configured to determine that dynamic metadata associated with the radio broadcast is unavailable for presentation using the display, generate an audio fingerprint of the radio broadcast when the indication is that the content of the radio broadcast is suitable for the audio fingerprinting process, send the audio fingerprint to the audio metadata service application via the Internet network interface, receive dynamic metadata associated with a radio broadcast corresponding to the audio fingerprint, and display information included in the dynamic metadata.

In Example 12, the subject matter or one or both of Examples 10 and 11 optionally includes a memory and a client application program configured to determine that dynamic metadata associated with the radio broadcast is unavailable for presentation using the display, generate an audio fingerprint of the radio broadcast when the indication is that the content of the radio broadcast is suitable for the audio fingerprinting process, identify metadata stored in the memory using the generated audio fingerprint, and display information included in the identified metadata.

In Example 13, the subject matter of one or any combination of Examples 10-12 optionally includes a client application program configured to determine that metadata associated with the radio broadcast is unavailable for presentation using the display, and not generate an audio fingerprint of the radio broadcast when the indication is that content of the radio broadcast signal is not suitable for the audio fingerprinting process.

In Example 14, the subject matter of one or any combination of Examples 10-13 optionally includes a client application program configured to receive, via the Internet network interface, metadata for all radio broadcasts available to the radio receiver for the geographical location information; and receive an indication for each available radio broadcast whether content of the radio broadcast is suitable for the audio fingerprinting process.

In Example 15, the subject matter of one or any combination of Examples 10-14 optionally includes an Internet network interface that is a cellular phone network.

In Example 16, the subject matter of one or any combination of Examples 10-14 optionally includes an Internet network interface that is a telematics network.

Example 17 can include subject matter, or can optionally be combined with one or any combination of Examples 1-16 to include such subject matter, such as a computer readable storage medium including instructions that, when performed by processing circuitry of a server, cause the processing circuitry to perform acts comprising: receiving geographic location information of a radio receiver via an intermediate communication platform that provides an interface to an Internet network; determining a radio broadcast available to the radio receiver according to the geographic location information; and sending metadata for the radio broadcast to the radio receiver via the intermediate communication platform, the metadata including an indication whether content of the radio broadcast is suitable for an audio fingerprinting process.

In Example 18, the subject matter of Example 17 optionally includes a computer readable storage medium including instructions that cause the processing circuitry to perform acts comprising: determining all radio broadcasts available to the radio receiver according to the geographic location information; and sending the metadata for the determined radio broadcasts, including the indications of suitability of the audio fingerprinting process for the determined radio broadcasts, in response to receiving the geographic location information.

In Example 19, the subject matter of one or both of Examples 17 and 18 optionally includes a computer readable storage medium including instructions that cause the processing circuitry to performing acts comprising: receiving an audio fingerprint from the radio receiver, determining audio metadata of a radio broadcast corresponding to the audio fingerprint, and sending the determined audio metadata to the radio receiver.

In Example 20, the subject matter of one or any combination of Examples 17-19 optionally includes a computer readable storage medium including instructions that cause the processing circuitry to perform acts comprising: sending the audio metadata determined according to the audio fingerprint received from the radio receiver to multiple other radio receivers via the intermediate communication platform.

These non-limiting examples can be combined in any permutation or combination. Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the targeted fingerprinting radio system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and FDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLINV), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Blu-ray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor.

The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM). The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the in-vehicle live guide generation system and method described herein, or portions thereof, may be stored, received, transmitted, or read from any desired combination of computer or machine readable media or storage devices and communication media in the form of computer executable instructions or other data structures.

Embodiments of the in-vehicle live guide generation system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

What is claimed is:

1. A system to provide audio metadata to a radio receiver, the system comprising:
   an intermediate communication platform that provides an interface to an Internet network; and
   a first server including:
      a port operatively coupled to the intermediate communication platform, processing circuitry, and a service application for execution by the processor, wherein the service application is configured to:
         receive geographic location information of a radio receiver via the intermediate communication platform;
         determine one or more radio broadcasts available to the radio receiver according to the geographic location information;
         send metadata for the radio broadcast to the radio receiver via the intermediate communication platform, the metadata including a metadata field containing an indication whether content of the radio broadcast is suitable for an audio fingerprinting process; and
         receive an audio fingerprint from the radio receiver for a radio broadcast for which the indication is that the radio broadcast is suitable for the audio fingerprinting process.

2. The system of claim 1,
   wherein the first server is configured to store indications of suitability of the audio fingerprinting process for multiple radio broadcasts in association with metadata for the multiple radio broadcasts;
   wherein the service application is configured to:
      determine all radio broadcasts available to the radio receiver according to the geographic location information; and
      send the metadata for the determined radio broadcasts, including the indications of suitability of the audio fingerprinting process for the determined radio broadcasts, in response to receiving the geographic location information.

3. The system of claim 1, wherein the service application is configured to:
   receive the audio fingerprint from the radio receiver via the intermediate communication platform;

determine audio metadata of a radio broadcast corresponding to the audio fingerprint; and
send the determined audio metadata to the radio receiver.

4. The system of claim 3, wherein the service application is configured to send the determined audio metadata to multiple radio receivers via the intermediate communication platform.

5. The system of claim 3, wherein the first server includes a memory configured to store the audio metadata in association with audio fingerprint information, and the service application is configured to determine the audio metadata by retrieving the audio metadata from the memory using the audio fingerprint.

6. The system of claim 3, including:
a second server configured to store the audio metadata; and
a communication network operatively coupled to the first and second servers;
wherein the service application of the first server is configured to determine the audio metadata by forwarding the audio fingerprint to the second server via the communication network and receive the audio metadata from the second server.

7. The system of claim 3, wherein the service application is configured to:
send the indication whether content of the radio broadcast is suitable for an audio fingerprinting process with static metadata;
receive an audio fingerprint from the radio receiver via the intermediate communication platform;
determine dynamic metadata of a radio broadcast corresponding to the audio fingerprint; and
send the determined dynamic metadata to the radio receiver via the intermediate communication platform.

8. The system of claim 1, wherein the intermediate communication platform is a cellular phone network.

9. The system of claim 1, wherein the intermediate communication platform is a telematics network.

10. A radio receiver comprising:
radio frequency (RF) receiver circuitry configured to receive a radio broadcast signal;
an Internet network interface;
a display;
processing circuitry; and
a client application program including instructions for execution by the processing circuitry, wherein the client application program is configured to:
send geographical location information to an audio metadata service application via the Internet network interface;
network interface, metadata for a radio broadcast available to the radio receiver, the metadata including an indication contained in a field of the metadata whether content of the radio broadcast is suitable for an audio fingerprinting process;
determine that dynamic metadata associated with the radio broadcast is unavailable for presentation using the display; and
generate an audio fingerprint of the radio broadcast when the indication is that the content of the radio broadcast is suitable for the audio fingerprinting process.

11. The radio receiver of claim 10, wherein the client application program is configured to:
send the audio fingerprint to the audio metadata service application via the Internet network interface;
receive dynamic metadata associated with a radio broadcast corresponding to the audio fingerprint; and
display information included in the dynamic metadata.

12. The radio receiver of claim 10, including a memory; wherein the client application program is configured to:
identify metadata stored in the memory using the generated audio fingerprint; and
display information included in the identified metadata.

13. The radio receiver of claim 10, wherein the client application program is configured to not generate an audio fingerprint of the radio broadcast when the indication is that content of the radio broadcast signal is not suitable for the audio fingerprinting process.

14. The radio receiver of claim 10, wherein the client application program is configured to:
receive, via the Internet network interface, metadata for all radio broadcasts available to the radio receiver for the geographical location information; and
receive an indication for each available radio broadcast whether content of the radio broadcast is suitable for the audio fingerprinting process.

15. The radio receiver of claim 10, wherein the Internet network interface is a cellular phone network.

16. The radio receiver of claim 10, wherein the Internet network interface is a telematics network.

17. A non-transitory computer readable storage medium including instructions that, when performed by processing circuitry of a server, cause the processing circuitry to perform acts comprising:
receiving geographic location information of a radio receiver via an intermediate communication platform that provides an interface to an Internet network;
determining a radio broadcast available to the radio receiver according to the geographic location information;
determining whether content of the radio broadcast is suitable for an audio fingerprinting process without audio fingerprinting of the content of the radio broadcast; and
sending metadata for the radio broadcast to the radio receiver via the intermediate communication platform, the metadata including a metadata field containing an indication whether content of the radio broadcast is suitable for an audio fingerprinting process; and
receiving an audio fingerprint from the radio receiver for a radio broadcast for which indication is that the radio broadcast is suitable for the audio fingerprinting process.

18. The non-transitory computer readable storage medium of claim 17, including instructions that cause the processing circuitry to perform acts comprising:
determining all radio broadcasts available to the radio receiver according to the geographic location information; and
sending the metadata for the determined radio broadcasts, including the indications of suitability of the audio fingerprinting process for the determined radio broadcasts, in response to receiving the geographic location information.

19. The non-transitory computer readable storage medium of claim 17, including instructions that cause the processing circuitry to perform acts comprising:
determining audio metadata of a radio broadcast corresponding to the audio fingerprint; and
sending the determined audio metadata to the radio receiver.

20. The non-transitory computer readable storage medium of claim 17, including instructions that cause the processing circuitry to perform acts comprising sending the audio metadata determined according to the audio fingerprint received from the radio receiver to multiple other radio receivers via the intermediate communication platform.

* * * * *